US007583563B2

(12) United States Patent
Nakajima

(10) Patent No.: US 7,583,563 B2
(45) Date of Patent: Sep. 1, 2009

(54) ULTRASONIC SENSOR

(75) Inventor: Akira Nakajima, Okazaki (JP)

(73) Assignee: DENSO CORPORATION, Kariya (JP)

( * ) Notice: Subject to any disclaimer, the term of this patent is extended or adjusted under 35 U.S.C. 154(b) by 582 days.

(21) Appl. No.: 11/108,757

(22) Filed: Apr. 19, 2005

(65) Prior Publication Data

US 2005/0236938 A1 Oct. 27, 2005

(30) Foreign Application Priority Data

Apr. 23, 2004 (JP) ............................ 2004-128446

(51) Int. Cl.
*G01N 29/00* (2006.01)
*G01S 7/521* (2006.01)

(52) U.S. Cl. ........................ 367/188; 340/435; 73/649; 367/99

(58) Field of Classification Search ................. 367/188, 367/152; 340/435, 943; 73/632, 649
See application file for complete search history.

(56) References Cited

U.S. PATENT DOCUMENTS

| | | | | |
|---|---|---|---|---|
| 4,754,440 | A * | 6/1988 | Naruse | 367/188 |
| 5,339,292 | A * | 8/1994 | Brown et al. | 367/176 |
| 5,629,690 | A * | 5/1997 | Knoll | 340/904 |
| 6,085,592 | A * | 7/2000 | Kawashima | 367/99 |
| 7,283,636 | B2 * | 10/2007 | Nishimura et al. | 381/152 |

FOREIGN PATENT DOCUMENTS

| | | |
|---|---|---|
| EP | 0881624 B1 * | 4/2003 |
| JP | A-60-208199 | 10/1985 |
| JP | A-U-H4-4497 | 1/1992 |
| JP | A-4-35600 | 2/1992 |
| JP | A-6-3436 | 1/1994 |
| JP | A-H09-215094 | 8/1997 |
| JP | A-11-192997 | 7/1999 |
| JP | A-2000-023296 | 1/2000 |
| JP | A-2001-215143 | 8/2001 |
| JP | A-2002-199482 | 7/2002 |
| JP | A-2003-32794 | 1/2003 |
| JP | A-2003-302385 | 10/2003 |
| JP | A-2003-302386 | 10/2003 |

OTHER PUBLICATIONS

Notice of Invitation to Submit Opinion from Korean Patent Office issued on Aug. 31, 2006 for the corresponding Korean patent application No. 10-2005-0033360 (a copy and English translation thereof).

Office Action dated Aug. 21, 2008 in corresponding Japanese patent application No. 2004-128446 (and English translation).

* cited by examiner

*Primary Examiner*—Ian J Lobo
(74) *Attorney, Agent, or Firm*—Posz Law Group, PLC

(57) ABSTRACT

An ultrasonic sensor consists of an ultrasonic transducer and a casing. The transducer includes a metal-made housing having an inner space; a vibrating planar member formed in the housing, wherein an outward surface of the vibrating planar member constitutes an outward surface of the housing and an inward surface of the vibrating planar member faces the inner space; and a driving element attached on an inward surface of the vibrating planar member for vibrating the vibrating planar member. This ultrasonic transducer is assembled within the casing and attached to a vehicle via the casing with the outward surface of the vibrating planar member exposed outwardly. Further, a resin film is attached using an adhesive member applied on a rear surface of the film to cover all the outward surface of the vibrating planner member.

14 Claims, 3 Drawing Sheets

ULTRASONIC SENSOR

CROSS REFERENCE TO RELATED APPLICATIONS

This application is based on and incorporates herein by reference Japanese Patent Application No. 2004-128446 filed on Apr. 23, 2004.

FIELD OF THE INVENTION

The present invention relates to an ultrasonic sensor used, for instance, in a vehicular obstacle detection device that is attached to a bumper of a vehicle for detecting an obstacle rearward of or at corners of the vehicle.

BACKGROUND OF THE INVENTION

There is proposed, as a conventional technology, an ultrasonic sensor that is attached to a bumper of a vehicle for detecting obstacles around the vehicle. (Refer to Patent Document 1)

Patent Document 1: JP-H04-35600 A

Here, a vibrating planar member (or vibrating face) of this type of the sensor is exposed in its surface outward of the vehicle, so this exposed surface is painted in the same color as the bumper of the vehicle. Further, the ultrasonic sensor is attached to the bumper or regions around the bumper, so thrown stones or gravels often hit the sensor to cause dents on the surface of the vibrating planar member. These dents or damages then bring about corrosion on the surface.

SUMMARY OF THE INVENTION

It is an object of the present invention to provide an ultrasonic sensor less subject to damage and corrosion.

To achieve the above object, an ultrasonic sensor is provided with the following. An ultrasonic transducer and a casing are included in the sensor. A metal-made housing, a vibrating planar member, and a driving element are included in the ultrasonic transducer. The housing includes an inner space. The vibrating planar member is formed in the housing, wherein an outward surface of the vibrating planar member constitutes an outward surface of the housing and an inward surface of the vibrating planar member faces the inner space. The driving element is attached on an inward surface of the vibrating planar member for vibrating the vibrating planar member. This ultrasonic transducer is assembled within the casing with at least the outward surface of the vibrating planar member exposed from the casing. Here, the ultrasonic transducer is attached to a vehicle via the casing so that the outward surface of the vibrating planar member is exposed outwardly. Further, a resin film is attached using an adhesive member applied on a rear surface of the resin film to cover all the outward surface of the vibrating planner member.

Under this structure, the film can help prevent hitting stones from damaging the vibrating planar member, so that the surface of the vibrating planar member is protected from being damaged and corroded.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1A:
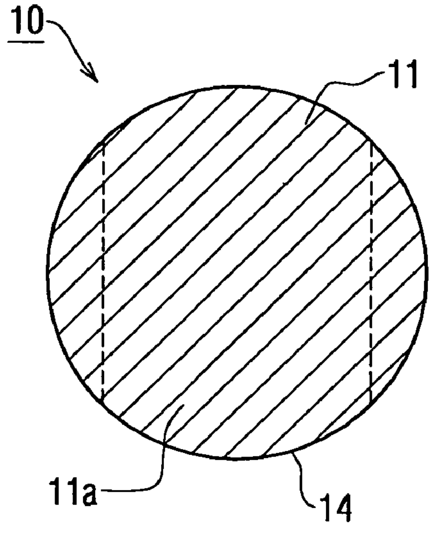
FIGS. 1A to 1D are views showing a structure of an ultrasonic transducer of an ultrasonic sensor according to an embodiment of the present invention.
Figure 1B:
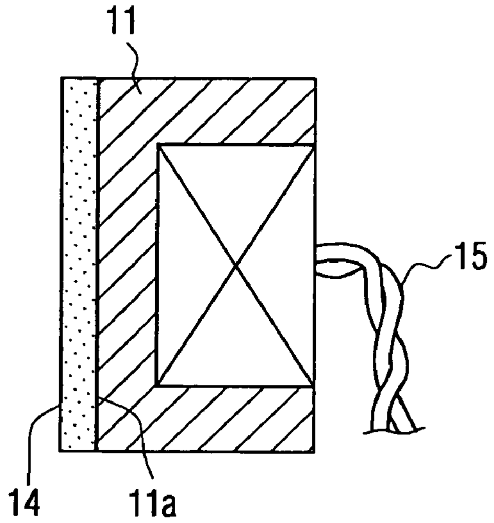
Figure 1C:
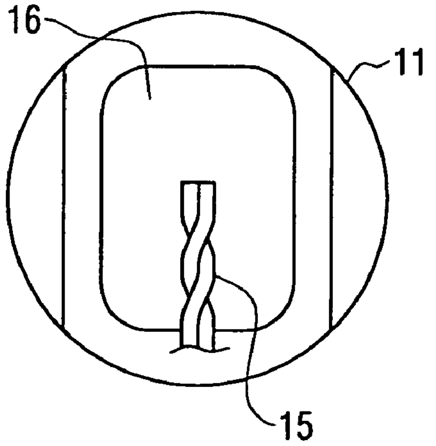
Figure 1D:
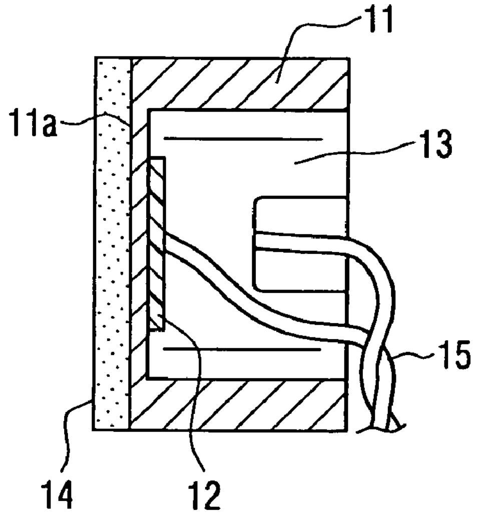

An ultrasonic transducer 10 of an ultrasonic sensor 20 according to an embodiment of the present invention will be explained below. FIG. 1A shows a front view of the ultrasonic transducer 10; FIG. 1B shows a side view; and FIG. 1C shows a rear view. The transducer 10 is formed of a housing 11 that has an inner space 13 filled with fillers. FIG. 1D shows a sectional side view of the transducer 10 without the fillers.

The housing 11 is made of aluminum to be electrically conductive. The housing 11 includes a vibrating planar member (or vibrating face) 11*a*. An outward surface of the vibrating planar member 11*a* constitutes an outward surface of the housing 11, while an inward surface of the vibrating planar member 11*a* faces the inner space 13, as shown in FIG. 1D. Inside the housing 11 or within the inner space 13, a piezoelectric element 12 is contained. The piezoelectric element 12 is attached on an inward surface of the vibrating planar member 11*a*. On the outward surface or front surface of the vibrating planar member 11*a*, a resin-made film 14 (also referred to herein as a "resin film" or a "film" or a "clear film")is glued so that the film 14 covers all the front surface of the vibrating planar member 11*a*.

The resin-made film 14 is a clear circular film formed of polyurethane. An adhesive material is applied on the rear surface of the film 14. All the surface of the housing 11 is painted in a given color (the same color as that of the bumper of the vehicle). Therefore, the front surface of the vibrating planar member 11*a* looks in the same color as the bumper of the vehicle via the clear film 14.

The piezoelectric element 12 is soldered with one terminal of a lead wire 15, while a portion on an internal wall of the housing 11 is soldered with the other terminal of the lead wire 15. Alternate signals are thereby applied on both terminal ends of the piezoelectric element 12 via the housing 11. Applying the alternate signals drives the piezoelectric element 12 to thereby cause the vibrating planar member 11*a* to vibrate. Namely, the piezoelectric element 12 works as a driving element for vibrating. The inner space 13 is filled with the fillers 16 such as silicon after the lead wire 15 is soldered.

Figure 2A:
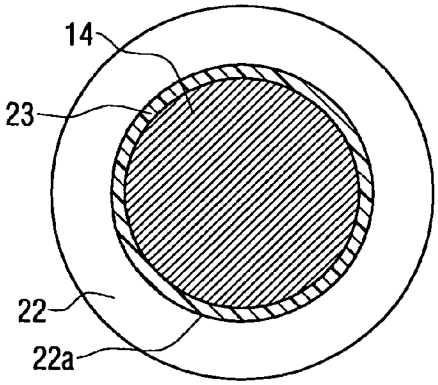
FIGS. 2A, 2B are views showing a state where an ultrasonic sensor is assembled to a bumper of a vehicle.
Figure 2B:
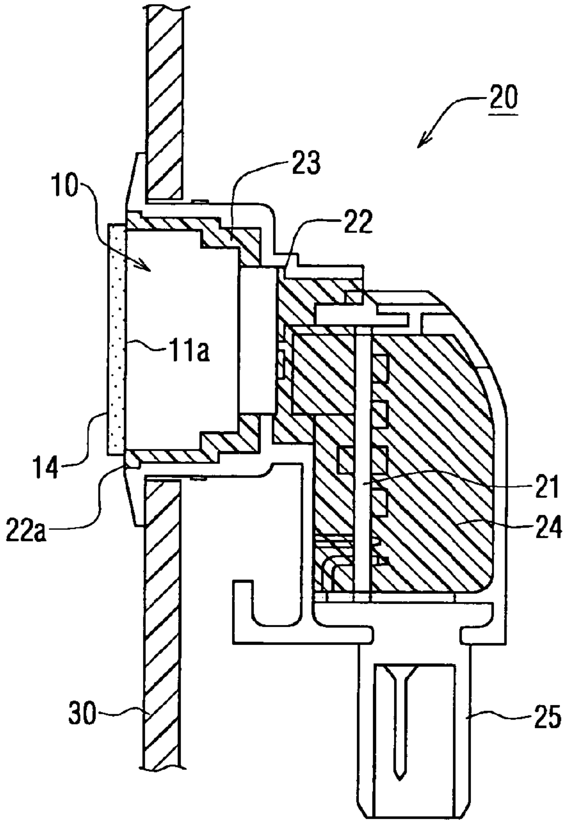

The ultrasonic sensor 20 including the ultrasonic transducer 10 is assembled in the bumper 30 of the vehicle, as shown in FIGS. 2A, 2B. FIG. 2A shows a front view. FIG. 2B shows a side view.

The ultrasonic sensor 20 consists of the ultrasonic transducer 10, a processing circuit board 21, and a resin-made casing 22 within which the ultrasonic transducer 10 and the processing circuit board 21 are assembled.

The processing circuit board 21 applies driving voltage generating ultrasonic on the ultrasonic transducer 10 while processing voltage generated from a counter-electromotive force effect from the ultrasonic transducer 10. Within the casing 22, a vibration isolating member 23 (silicon rubber) is provided to surround the ultrasonic transducer 10 for preventing vibration transmission to the casing 22. Further, silicon resin for preventing moisture is filled rearward of the processing circuit board 21. The processing circuit board 21 connects via a connector 25 to a controller (not shown), which performs obstacle detection for the rear or corners of the vehicle.

The casing 22 has a circular opening face 22*a* through which the ultrasonic transducer 10 and the vibration isolating member 23 are inserted (rightward in FIG. 2B) and assembled. Thus, the vibrating planar member 11*a* of the ultrasonic transducer 10 is exposed outwardly via the opening face 22*a*. The surfaces of the opening face 22*a* of the casing 22 and the vibrating planar member 11*a* of the ultrasonic transducer 10 become approximately flat and outer circumferences of the two surfaces form concentric circles.

The lead wire 15 of the ultrasonic transducer 10 is soldered to the processing circuit board 21 to be electrically connected. The processing circuit board 21 includes a variable resistor (not shown) for adjusting sensitivity of the sensor. This variable resistor can be manually adjustable by turning a given volume. The adjustment of the sensor sensitivity is conducted as follows. A pole as an obstacle is positioned in a given distance away from the ultrasonic sensor 20. The above variable resistor is adjusted while monitoring output signals, from the processing circuit board 21, deriving from the pole.

After being adjusted, the processing circuit board 21 is inserted from the rear of the casing 22, and the silicon resin 24 for preventing moisture is filled in the rear portion of the casing 22 to thereby complete the assembling of the ultrasonic sensor 20.

As explained above, the resin-made film 14 is glued over the entire outward surface of the vibrating planar member 11*a* of the ultrasonic transducer 10, so that the film 14 works to protect the ultrasonic transducer 10*a* from hitting stones or the like to help prevent damage of the surface of the vibrating planar member 11*a*. Thus, the surface of the vibrating planar member 11*a* can be prevented from being damaged or corroded.

The above-described sensitivity adjustment is performed under condition where this film 14 is being glued on the surface of the vibrating planar member 11*a*. For instance, when a film obtained from a market is attached to the vibrating planar member 11*a* after the sensitivity adjustment is completed, the sensitivity degrades to thereby decrease a detectable region. However, as in this embodiment, the sensitivity adjustment is performed under condition where the film 14 is already glued on the vibrating planar member 11*a* of the ultrasonic transducer 10, the above problems can be solved.

Figure 3A:
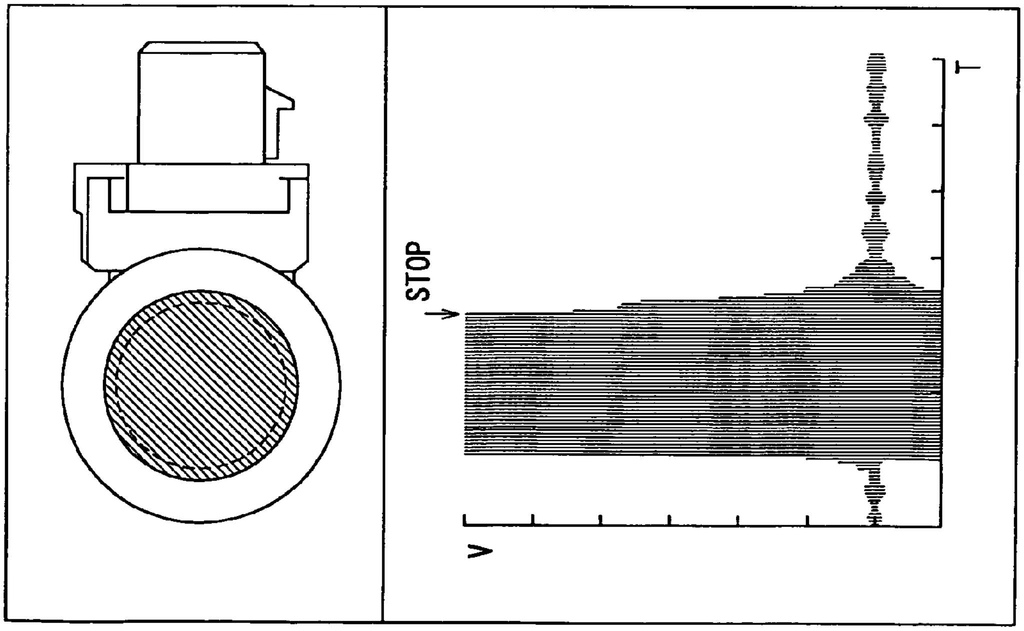
FIGS. 3A, 3B are graphs showing sound reverberations when different-sized films are glued on a vibrating planar member.
Figure 3B:
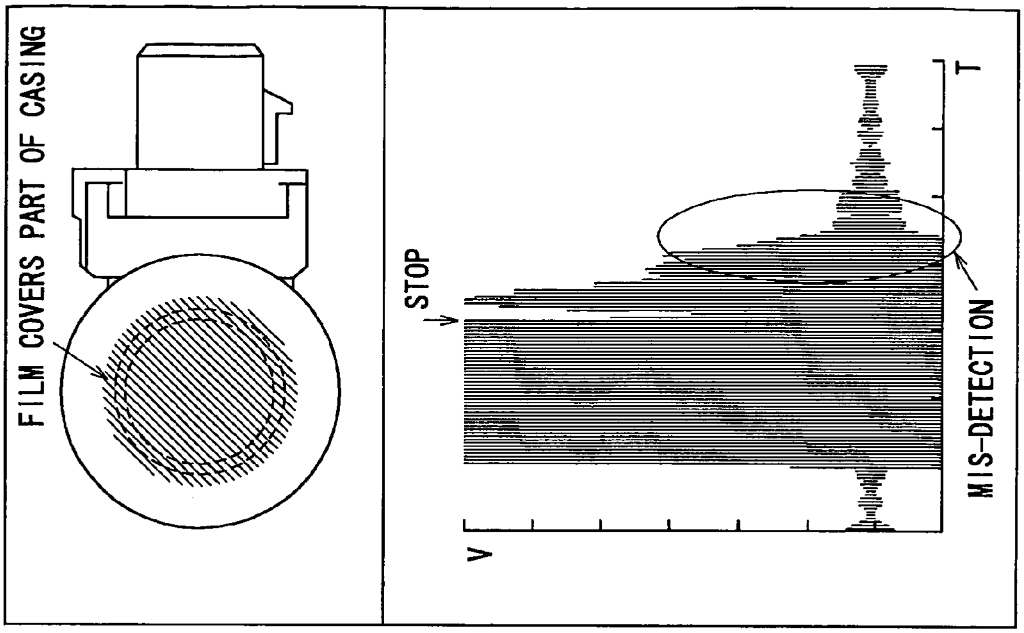

Next, sound reverberations generated when different-sized films are glued on a vibrating planar member 11*a* will be explained with reference to FIGS. 3A, 3B. FIG. 3A shows sound reverberations generated when the size of the film 14 is the same as or a little larger than that of the front surface of the vibrating planar member 11*a*, but does not cover or contact a part of the casing 22 that surrounds the vibrating planar member 11*a* and the vibration isolating member 23. FIG. 3B shows sound reverberations generated when the size of the film 14 is larger than that of the front surface of the vibrating planar member 11*a*, and covers or contacts a part of the casing 22.

Here, the sound reverberations means a phenomenon that the vibrating planar member 11*a* continues to vibrate without stopping the vibration even after alternate signals applied to both terminal ends of the piezoelectric element 12 is stopped. The sound reverberations being large and continued long may cause mis-detection of the sensor.

As shown in FIG. 3B, even after the alternate signals are stopped, there are found sound reverberations larger and longer than those in FIG. 3A.

In contrast, in FIG. 3A, after the alternate signals are stopped, there are scarcely found sound reverberations. The cause of this phenomenon is explained as follows. Since the film 14 contacts the casing 22, the vibration of the vibrating planar member 11*a* is transmitted via the film 14 to the casing 22; contrary, the vibration of the casing 22 is transmitted via the film 14 to the vibrating planar member 11*a*. Therefore, when the alternate signals are applied, the casing 22 vibrates along with the vibrating planar member 11*a*. Thereafter, when the alternate signals stop, the vibrating planar member 11*a* is going to stop the vibration. However, the vibration of the casing that was vibrating while the alternate signals were being applied is transmitted to the vibrating planar member 11*a*, so that the vibrating planar member 11*a* continues vibrating without stopping right away. This results in the sound reverberations.

In contrast, in the ultrasonic sensor 20 of this embodiment, the size of the film 14 is the same as or a little larger than that of the front surface of the vibrating planar member 11*a*, but does not cover or contact a part of the casing 22 that surrounds the vibrating planar member 11*a* and the vibration isolating member 23. Therefore, there are no problems deriving from sound reverberations as in FIG. 3B, so that mis-detection can be prevented. More reliable detection can be thereby achieved. Further, the ultrasonic transducer 10 is disposed via the vibration isolating member 23 within the casing 22, so that the vibration of the ultrasonic transducer 10 is not easily transmitted to the casing 22.

Further, the size of the film 14 can be designed to be a little smaller than that of the front surface of the vibrating planar member 11*a* so that the film 14 does not contact the casing 22. However, in this size, a part (peripheral portion) of the front surface of the vibrating planar member 11*a* is exposed outwardly, so that this part is vulnerable to damage and corrosion. When this part is damaged and corroded, the corrosion prevails from this part to thereby possibly cause the entire part of the vibrating planar member 11*a* to be corroded. Therefore, gluing the film 14 as covering the entire surface of the vibrating planar member 11*a* is effective in preventing the foregoing problem.

Further, in this embodiment, the housing 11 is colored in the given color, and the clear film 14 is attached, so the vibrating planar member 11*a* can be seen in the same color as in the bumper of the vehicle. However, the paint having the same color as that of the bumper can be applied on the front surface or the rear surface of the film 14. In this case, the paint on the housing 11 can be eliminated.

It will be obvious to those skilled in the art that various changes may be made in the above-described embodiments of the present invention. However, the scope of the present invention should be determined by the following claims.

What is claimed is:

1. An ultrasonic sensor comprising:

an ultrasonic transducer including a metal-made housing that includes an inner space, a vibrating planar member that is formed in the housing, wherein an outward surface of the vibrating planar member constitutes an outward surface of the housing and an inward surface of the vibrating planar member faces the inner space;

a driving element that is attached on an inward surface of the vibrating planar member for vibrating the vibrating planar member;

a casing within which the ultrasonic transducer assembled, wherein at least the outward surface of the vibrating planar member is exposed from the casing; and a vibration isolating member that is located between the casing and the ultrasonic transducer for limiting transmission of vibration from the transducer to the casing, wherein the ultrasonic transducer is attached to a vehicle via the casing so that the outward surface of the vibrating planar member faces to the outside of the vehicle, wherein a resin film is attached using an adhesive member applied on a rear surface of the resin film to cover all the outward surface of the vibrating planar member, and wherein a size of the resin film is equal to or larger than a size of the outward surface of the vibrating planer member, and the resin film dies not contact the casing located outside of the ultrasonic transducer.

2. The ultrasonic sensor of claim 1, wherein the surface of the vibrating planar member is colored in a given color and the film is clear.

3. The ultrasonic sensor of claim 2, wherein the given color is equal to a color of a bumper of the vehicle.

4. The ultrasonic sensor of claim 1, wherein one of a front surface and a rear surface of the film is colored in a given color.

5. The ultrasonic sensor of claim 4, wherein the given color is equal to a color of a bumper of the vehicle.

6. The ultrasonic sensor of claim 1, wherein the metal-made housing is made of aluminum.

7. The ultrasonic sensor of claim 1, further comprising:

a processing circuit board that drives the ultrasonic transducer, wherein sensor sensitivity is adjusted using the processing circuit board when the film is attached on the outward surface of the vibrating planar member, and wherein, after the sensor sensitivity is adjusted, a filler is filled within the casing.

8. The ultrasonic sensor of claim 1, wherein the resin film is located and arranged to protect the outward surface of the vibrating planar member from being directly exposed to an environment outside of the vehicle.

9. The ultrasonic sensor of claim 1, wherein the resin film is located such that the vibrating planar member is between the resin film and the driving element.

10. The ultrasonic sensor of claim 1, wherein the outward surface of the resin film is exposed to an environment of the vehicle to protect the vibrating planar member from damage.

11. The ultrasonic sensor of claim 1, wherein the resin film is a polyurethane film.

12. The ultrasonic sensor of claim 1, wherein the resin film is a clear polyurethane film.

13. The ultrasonic sensor of claim 1, wherein a sensitivity adjustment is performed under a condition where the resin film is attached and covers all of the outward surface of the vibrating planar member.

14. An ultrasonic sensor comprising:

an ultrasonic transducer, wherein the ultrasonic transducer includes a metal housing, which includes an inner space, a driving element, which is located within the inner space, and a vibrating planar member, which is formed in the housing, wherein the vibrating planar member has an inner surface, which faces the driving element, and an outer surface, which is opposite to the inner surface and which faces away from the driving element, and the driving element is attached directly to the inner surface of the vibrating planar member for vibrating the vibrating planar member; and a casing within which the ultrasonic transducer is assembled, wherein the outer surface of the vibrating planar member is exposed to an outside of the casing, wherein the ultrasonic transducer is adapted to be attached to a vehicle via the casing so that the outward surface of the vibrating planar member faces away from the vehicle, and a resin film is adhered directly to the outer surface of the vibrating planar member such that the vibrating planar member is between the resin film and the driving element to cover and protect the entire outer surface of the vibrating planar member and wherein a size of the resin film is equal to or larger than a size of the outer surface of the vibrating planar member, and the resin film does not contact the casing located outside of the ultrasonic transducer.

* * * * *